May 2, 1939.  G. AUSTRIA  2,156,421
SHREDDER
Filed Jan. 12, 1937
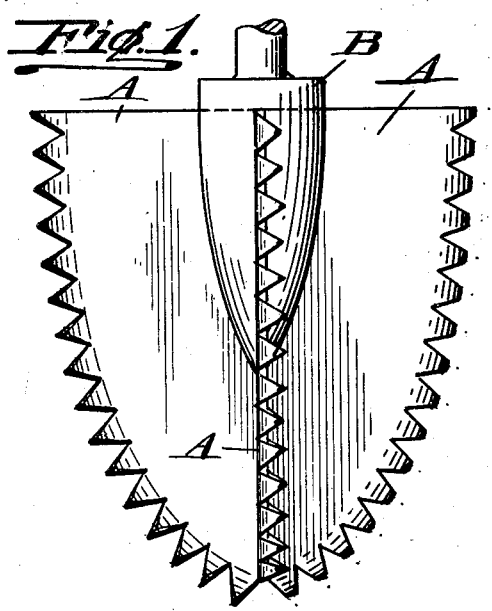
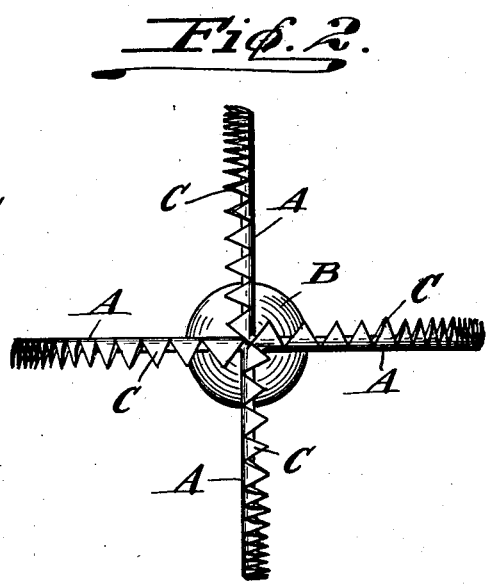
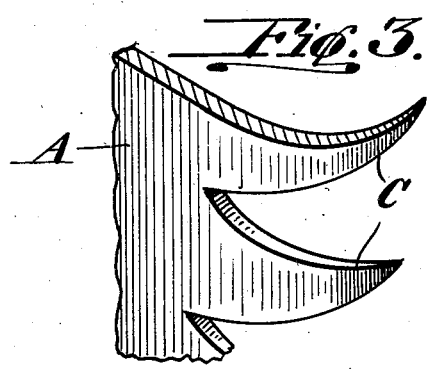
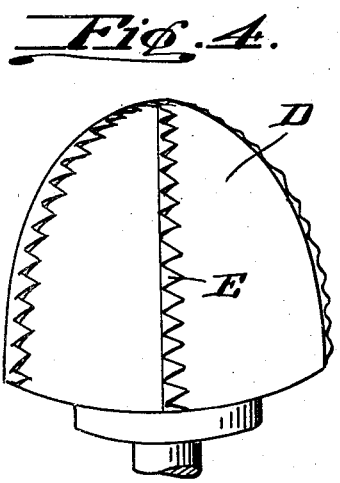
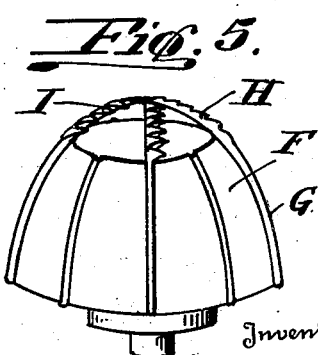
Inventor
Guillermo Austria
By R. S. Berry
Attorney Patented May 2, 1939

2,156,421

UNITED STATES PATENT OFFICE 2,156,421

SHREDDER

Guillermo Austria, Los Angeles, Calif.

Application January 12, 1937, Serial No. 120,210

2 Claims. (Cl. 146—106)

This invention relates to a shredder and more particularly pertains to a utensil which is especially applicable for use in shredding cocoanuts and in the extraction of juices and pulp from citrus fruits and the like.

An object of the invention is to provide a tool embodying a series of teeth so formed and arranged that on operating the tool to advance the teeth thereof in engagement with the materials to be shredded, the teeth will effect a gouging action and thereby rapidly and effectually perform the shredding function.

A further object is to provide a shredder which is so formed that it may be inserted within a segment of a cocoanut or citrus fruit and the tooth portion thereof positioned to conform to the concave contour of the interior of the nut shell or fruit ring so as to readily effect a shredding action on the meat or pulp adjacent the shell of the nut or rind of the fruit.

With the foregoing objects in view together with such other objects and advantages as may subsequently appear, the invention is carried into effect as illustrated by way of example in the accompanying drawing, in which:

Fig. 1 is a view in side elevation of the shredder showing it as especially adapted for use in shredding cocoanuts and the like;

Fig. 2 is an end view of the shredder shown in Fig. 1;

Fig. 3 is a detail in section and perspective showing the manner of forming the shredder teeth;

Fig. 4 is a perspective view showing the invention as applied to citrus fruit juice and pulp extractor;

Fig. 5 is a perspective view depicting a modified form of the invention.

Referring to the drawing more specifically, the shredder as shown in Figs. 1 and 2 embodies a series of blades A here shown as four in number projecting radially from a hub B with the blades disposed equi-distant apart. The working edges of the blades extend substantially upon parabolic curves leading outwardly from the tips of the blades which tips are disposed in axial alignment with the hub B in spaced relation to the latter; and formed on the curved edges of the blade are a series of shredding teeth C which are of general triangular outline. The teeth C are bent longitudinally to curve the teeth as particularly shown in Fig. 3 to present the tips thereof laterally and obliquely relative to the blades and in a direction in which the blades are to be advanced so that the teeth will effect a gouging or plowing action upon cocoanut meats or other materials engaged by the teeth, to effect a shredding action thereon. The device thus formed is designed to be rotated to advance the teeth into the materials being shredded. Since the teeth tend to form grooves it is desirable that the tips of the teeth of adjacent blades be disposed in off-set relation to each other so that the teeth of one blade will tend to plow into ridges formed by the teeth of the preceding blade.

In carrying out the invention to adapt it for use as a cocoanut shredder, a considerable blade width is afforded between the hub B and the base lines of the teeth C so as to permit accumulation of shredded cocoanut meat between the adjacent blades where the tool is operated by extending it downwardly within a segment of a cocoanut in the position shown in Fig. 1, and to allow free passage of the cocoanut meat between the blades where the latter are disposed in an inverted position opposite that shown in Fig. 1 and the nut shell inverted over the tool.

In applying the invention to a juice and pulp remover, as shown in Fig. 4, a parabolic body D is provided on the surface of which is arranged a series of longitudinally extending rows of teeth E of the character indicated at C in Fig. 3; the teeth being curved to present their tips to extend in or approximate to the general direction of the lateral curvature of the body D whereby on cupping a segment of a citrus fruit over the reduced end of the body D and rotating either the fruit or the body D in a direction to direct the teeth into the fruit, the teeth will effect a gouging action on the latter and thus effect ready removal of the pulp of the fruit and also shred a portion of the rind when so desired. In this instance the surface of the body portion D facilitates squeezing of the fruit in effecting extraction of the juices therefrom.

In the form of the invention shown in Fig. 5 depicting a combined juice extractor and shredder, a truncated tapered body F is provided having a series of longitudinally extending ribs G and mounted on the reduced end of the body F is a series of bars H which project from the body F at an inclination and meet at their outer ends at a point in axial alignment with the body F. Formed on the bars H are teeth I similar in formation to the teeth C shown in Fig. 3, that is with the tips of the teeth on the adjacent bars extending laterally relative thereto and arranged with the tips of the teeth on one bar presented towards the adjacent bar, whereby on rotating the device with the teeth thereof engaging the meat of a cocoanut within the shell thereof or the pulp or rind of a citrus fruit, a gouging shredding action will be effected.

The device as here depicted may be formed of any suitable material, being preferably formed of metal throughout and may be mounted and arranged for rotation relative to the nut or fruit to be shredded or to be maintained stationary while the fruit or nut is rotated relative thereto.

While I have described the device as utilized in shredding cocoanuts and citrus fruits, it is manifestly applicable for use in effecting shredding of any other materials capable of being shredded by the action of the teeth C thereon, and while I have shown and described a specific embodiment of the invention, I do not limit myself to the exact structure set forth but may employ such modifications as come within the meaning and scope of the appended claims.

I claim:

1. In a shredder, a series of radially extending blades, a hub supporting said blades, said blades having their outer margins extended on parabolic curves leading from a point in axial alignment with the hub, and shredding teeth formed on the margins of said blades, said teeth being curved transversely from their base portions to present the tips thereof laterally relative to said blades.

2. In a shredder, a hub adapted to be rotated, a series of blades carried by said hub having their outer margins extending on parabolic curves leading from a point in axial alignment with the hub, and shredding teeth formed on the outer margins of said blades having their outer end portions curved laterally and obliquely relative to the blades and with their tips presented in the direction of advance of the blades on rotation of said hub.

GUILLERMO AUSTRIA.